Aug. 31, 1965                W. G. McELFRESH ETAL                3,203,103
                           UNIVERSAL TORSION SPRING GAUGE
Filed May 8, 1961                                               2 Sheets-Sheet 1
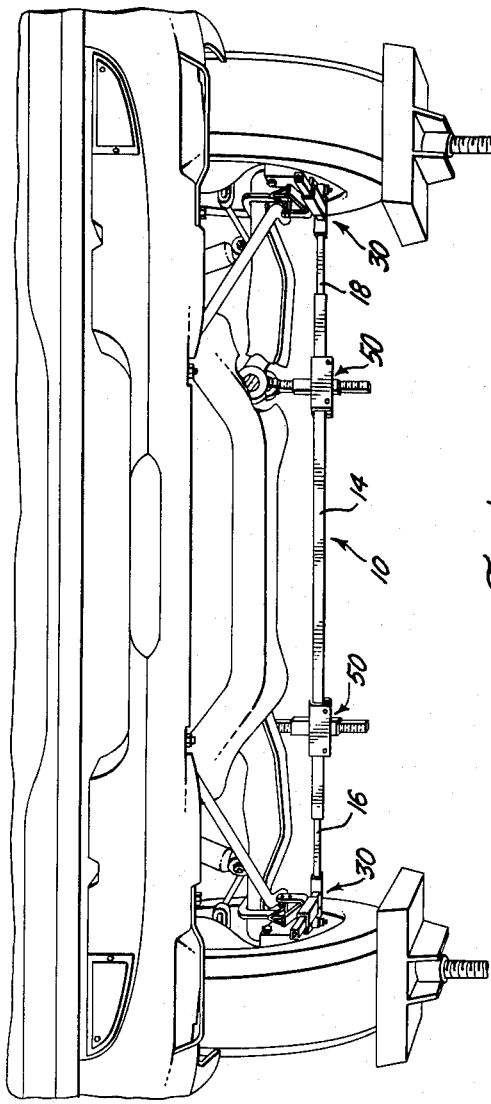
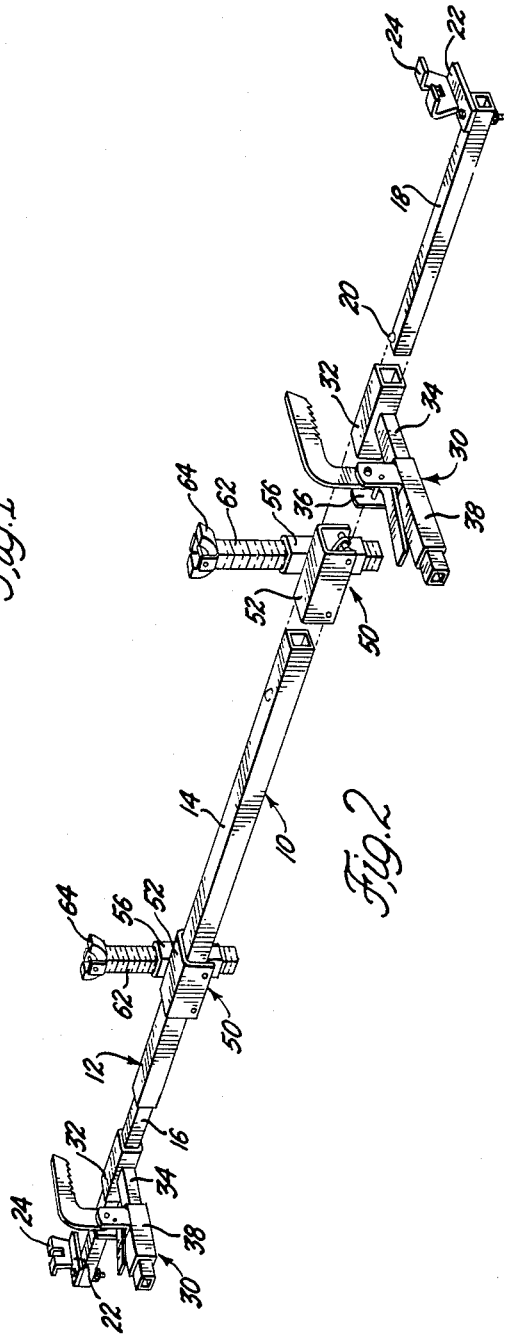
INVENTORS
WILLIAM G. McELFRESH
BY & WILLIAM A. ROSS
Dale A. Winnie
ATTORNEY Aug. 31, 1965   W. G. McELFRESH ETAL   3,203,103
UNIVERSAL TORSION SPRING GAUGE
Filed May 8, 1961   2 Sheets-Sheet 2
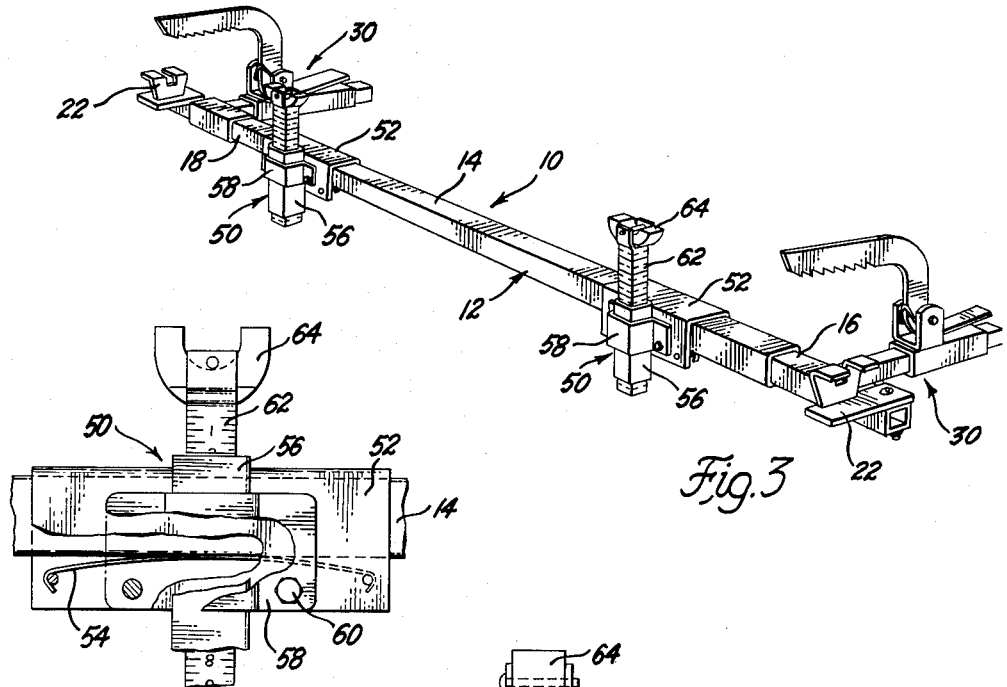
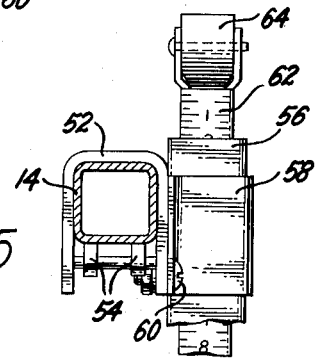
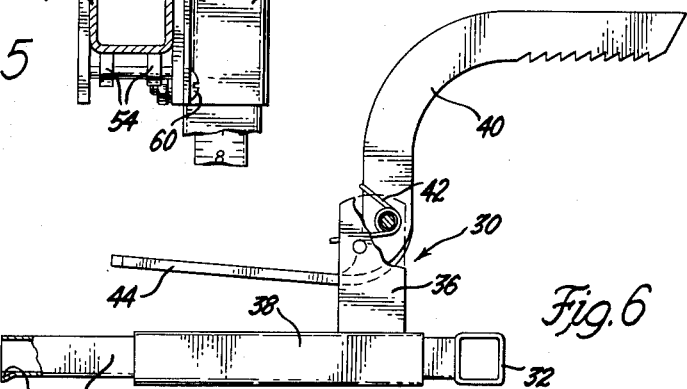
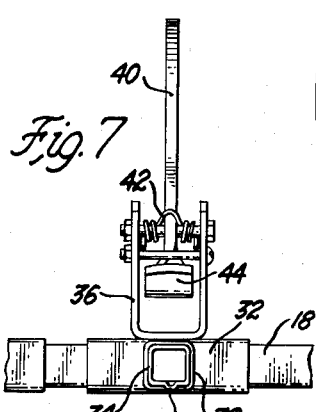
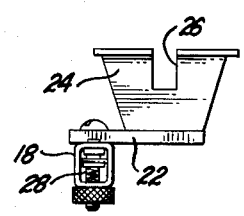
INVENTORS
WILLIAM G. McELFRESH
BY & WILLIAM A. ROSS
ATTORNEY

United States Patent Office 3,203,103
Patented Aug. 31, 1965

3,203,103
UNIVERSAL TORSION SPRING GAUGE
William G. McElfresh and William A. Ross, Springfield, Ill., assignors to Dura Corporation, Oak Park, Mich., a corporation of Michigan
Filed May 8, 1961, Ser. No. 108,623
5 Claims. (Cl. 38—181)

This invention relates to vehicle wheel alignment equipment and more particularly to a guage device for measuring wheel alignment on vehicles having a torsion spring suspension system.

Torsion spring suspension systems require that equal amounts of torque be applied to each torsion spring unit of a pair of vehicle wheels to preclude unequal camber which will cause a vehicle to pull to one side. Manufacturers of vehicles using torsion spring suspension systems normally specify the proper tension in terms of carrying height at the vehicle wheels or otherwise designate a linear dimension and tolerance determinative of such tension.

Because of the many different makes and models of cars and trucks which use torsion spring suspension systems, with different control arm lengths, angular dispositions, etc., numerous different special tools have had to be kept on hand by garages, gas stations and local repair shops. The cost and storage of such special tools is always a problem to repair personnel.

It is an object of this invention to provide a torsion suspension gauge for checking vehicle wheel alignment by measuring carrying height at the respective vehicle wheels and which is adaptable for use on all vehicles using a torsion spring suspension system.

It is an object of this invention to provide a universal gauge device suitable for use with present cars, trucks and buses and adaptable for use on future designs despite changes in wheel tread, suspension arm length or location, and the like.

The gauge device of this invention is readily adjustable for tread width, includes repositionable clamps and scales to accommodate different structural arrangements in different torsion suspension systems, includes means permitting springing the vehicle and making torsional adjustments without interference, and, if necessary, is inexpensively modified for any subsequent changes in vehicle structure not presently anticipated.

The aforementioned and other objects and advantages of this invention, and the benefits derived in the use thereof, will be more fully understood and appreciated upon reading the description which follows and studying the related drawings.

In the drawings:

FIG. 1 is a perspective view of the torsion suspension gauge of this invention as adapted for use on an automotive vehicle.

FIG. 2 is a perspective exploded view of the torsion suspension gauge assembly of this invention.

FIG. 3 is a perspective view of the gauge device shown by FIGURE 2 as viewed from the other side thereof and as adapted for calibration.

FIG. 4 is an enlarged front plan detail view of the carriage assembly supporting the linear measuring scales.

FIG. 5 is a side view of the linear scale carriage assembly shown by FIGURE 4.

FIG. 6 is an enlarged side plan view of the sliding clamp assembly.

FIG. 7 is a front face view of the clamp assembly shown by FIGURE 6.

FIG. 8 is an enlarged end view of one of the swivel units provided on the ends of the telescoping members in the over-all assembly.

The suspension gauge assembly 10 is best shown in FIGURES 2 and 3. The assembly 10 includes a telescoping member 12 made up of a tubular center section 14 having tubular end sections 16 and 18 received in opposite ends thereof and extendable therefrom. Suitable safety stops 20 are cooperatively provided between the center and end sections to prevent undue extension thereof.

It will be appreciated that the square cross section of the telescoping center and end sections 14, 16 and 18 assure relative alignment of the extensions in their retracted and extended positions.

Swivel members 22 are mounted on the ends of the telescoping end sections 16 and 18 and a contact bracket pad 24 is provided thereon for engagement with one end of the torsion spring assembly to be measured, as will subsequently be described. The bracket 24 is relieved at 26 to accommodate the lubrication fitting found on certain vehicles at the location where the contact pad is used.

An end view of one of the telescoping end sections, as shown by FIGURE 8, shows the spring mechanism which is operative of the stop detent 20, to prevent unintentional separation of the telescoping members. It also shows the knurled nut on the end of the threaded bolt which retains the bracket 24 in pivotal engagement on the end of the telescoping members.

The clamp assemblies 30 are provided on each of the telescoping end sections 16 and 18. They include a slide 32 of tubular cross section reciprocal on the telescoping end sections 16 and 18. A clamp supporting tube 34 is formed as a part of the slide 32 and extends transversely thereof. The clamp supporting bracket 36 is mounted on a tubular slide 38 that is disposed for reciprocation on the transverse slide extension 34.

The clamp bracket 36 has the serrated jaw member 40 pivotally supported therein and biased for clamping action by a torsion spring 42. An extension of the jaw member 40 provides a manually operable release lever 44.

The clamp assembly is reciprocal on the telescoping end sections 16 and 18 between the center telescoping section 14 and the swivel members 22. The jaw member 40 of the clamp is itself reciprocal on the tubular section 34 between the slide 32 and a stop 46.

The center section 14 of the telescoping member 12 has a pair of slide carriage assemblies 50 provided thereon. These each include a saddle member 52 having leaf springs 54 provided near the open side thereof for spring tensioning of the saddle on the center gauge section 14. Each of the members 52 include a vertically disposed tubular member 56 which is retained against one side thereof by a bracket 58. The bracket 58 is held to the side of the members 52 by screw retainers 60 which may be loosened 50 enable the vertical tube 56 to be vertically adjusted.

Linear measuring scales 62 are provided within the vertical tubes 56 and are vertically reciprocal. The scales 62 include indicia of linear measurement on all four sides thereof and have a U-shaped magnet 64 pivotally mounted at the upper ends thereof.

It will be appreciated that both the clamp assemblies 30 and the scale supporting carriages 50 may be disposed on either side of the telescoping member 12. Accordingly, the clamping jaws are operable from either side of the telescoping member, relative to the scale carriages 50, and are adjustable outwardly towards or inwardly from the vehicle wheels. Similarly, the scale assemblies 50 may be positioned on either side of the telescoping member for better alignment with the gauging points to be used. Further, as previously mentioned, the members 22 at the ends of the telescoping end sections 16 and 18 may be suitably positioned for gauging points which may not be aligned.

Referring to FIGURE 3, the suspension gauge assembly 10 of this invention is calibrated by having a one-inch gauge block placed on each of the contact pads 24 and a straight edge 68 extended therebetween. With the magnets 64 of the linear scales 62 engaged with the straight edge the tubular member 56 is adjusted so that the upper edge thereof is aligned with the one-inch indicia provided on the measuring scale.

The torsion suspension gauge of this invention is used for checking and adjusting the torsion springs on automotive vehicles, trucks and buses having a torsion suspension system. The gauge enables measuring the carrying height of a torsion suspension member and by comparison with manufacturers requirements it dictates any change in torque to prevent undue wheel camber and to assure proper wheel alignment.

The carrying height of a vehicle suspension system is properly determined with full vehicle weight on the vehicle wheels. Accordingly, wheel supporting members are required to lift the vehicle to a relatively level disposition. Naturally, both tires should have approximately the same air pressure and the vehicle should be reasonably level from front to rear.

The end sections 16 and 18 of the telescoping member 12 are extended approximately the same distance from the center section 14 until the contact pads 24 are located under the outer ends of the wheel supporting suspension members. The clamp assemblies 30 are then moved out towards the ends of the end sections and the jaw members 40 are engaged to any convenient part of the suspension structure which will hold the contact pads 24 in engagement with the ends of the suspension members under which they have been previously positioned.

Normally, the contact pads will be held in engagement with the ball joint housings at the vehicle wheels by engagement of the jaw members with the torsion spring members themselves. However, different suspension systems and vehicle understructures may dictate a different arrangement. The prime consideration is location of the contact pads at a fixed location relative to the ends of the wheel supporting suspension arms.

The normal position afforded by the suspension system is next obtained by springing the vehicle manually.

The slide carriages 50 supporting the linear measuring scales 62 are next positioned under the lower control arm bushing at the other ends of the suspension arms. The scales are next raised until the magnets fasten to the underside of the bushings, suspension guide arms or the like. This is dependent solely upon whether the engagement of the contact pads is with the torsion spring, guide arm or other related structure at the other ends of the suspension members. The scale reading may now be taken at the upper edge of the vertical tubes 56 and should be within one-eighth inch of one another and within one-eighth inch of factory specifications.

If any adjustments are required, the tension on the control arm should be relieved by manually springing the vehicle once more before subsequent readings are taken. It will be appreciated that springing the vehicle does not disassociate the scales from engagement with the suspension members due to the magnetic attraction therebetween.

The torsion suspension gauge of this invention is suitable for checking and adjusting torsion suspension carrying heights of numerous different vehicles. It is readily adaptable for use with different vehicles due to its adjustable character in all directions.

The use of magnets to hold the calibrated members to the suspension structure enables fast and accurate checking or adjustment of torsion springs.

The gauge is sturdy in construction and is readily recalibrated whenever desirable. Further, each of the different assembly parts, if broken or damaged, may be replaced without sacrifice of the whole gauge.

We claim:

1. A universal torsion suspension gauge for checking wheel alignment on vehicles having a torsion spring suspension system, and comprising: a tubular member having telescoping end sections extendable between a pair of torsion spring supported vehicle wheels, swivel means provided on the ends of said telescoping end sections and selectively positionable for engagement with the outer ends of the torsion spring members supporting said wheels, transversely and laterally adjustable clamps provided on said telescoping end sections and selectively positionable near the ends thereof for engagement with said torsion spring members and for holding said swivel means engaged with the outer ends of said torsion spring members, laterally adjustable members including vertically adjustable linear measuring scales provided on said tubular member and selectively positionable on either side thereof for relative alignment of said scales under the other ends of said torsion spring members, and means of magnetic attraction provided on the ends of said scales for selective attraction and attachment to said other torsion spring ends permitting springing of said suspension system without dislocation thereof, said scales being calibrated to measure the carrying height between the respective ends of said torsion spring members.

2. The torsion suspension gauge of claim 1 including laterally reciprocal members on said tubular member having vertically disposed tubular members supported thereon, said linear measuring scales being reciprocal within said vertically disposed tubular members for alignment with the swivel means at the ends of said telescoping end sections and calibration of said suspension gauge.

3. A universal torsion suspension gauge for checking wheel alignment on vehicles having a torsion spring suspension system, and comprising: an elongated member including a center section having end sections telescopically engaged therewithin and extendible relative thereto, means provided on each of said telescopic end sections for fixed engagement with and location thereof relative to the outer disposed ends of said torsion spring members, and laterally adjustable means provided on said center section for selective alignment under the inner ends of said torsion spring members and including a linear scale having means of detachable engagement to gauging points of said torsion spring members and for unrestrictedly reciprocal movement relative thereto in the free springing of said torsion spring members.

4. A universal torsion suspension gauge for checking wheel alignment on vehicles having a torsion spring suspension system, and comprising: an elongated member including a center section of rectangular cross section having end sections of like cross section telescopically engaged within and axially extendible relative thereto, said elongated member being extendible between a pair of torsion spring supported vehicle wheels and having means provided on each of said end sections for location and engagement with the outer disposed ends of the torsion spring members supporting said vehicle wheels, a pair of laterally adjustable means provided on said center section and each including vertically adjustable and calibrated means for location and engagement with the respective inner disposed ends of said torsion spring members, adjustable means provided on each of said end sections for clamping engagement with said torsion spring members intermediate the ends thereof, said adjustable means each including members oriented and guided on the rectangular sections on which disposed, and said vertically adjustable and calibrated means each including magnetic means provided on the end thereof for both attractive engagement with said torsion spring members and extension thereof for measuring the carrying height of said respective torsion spring members and providing for a comparative reading therebetween.

5. A gauge device for measuring the relative height of a suspension member without disasociation therefrom in the course of springing thereof, and comprising: a linear measuring scale having means for magnetic attraction to the gauging point of a suspension member provided on one end thereof, a housing member receptive of said scale in telescopic engagement therewith and for relatively uninhibited free reciprocating movement of said scale in and out thereof, and separate means removed and apart from the measuring scale and independent thereof for supporting the housing member in a fixed position relative to the outer disposed end of said suspension member and under the gauging point of the inner disposed end of said suspension member for free movement of the scale relative to the housing in the springing of the suspension member and for gauging the heighth thereof over the reference point of the housing member immediately upon the conclusion of such springing action.

References Cited by the Examiner

UNITED STATES PATENTS

| | | | |
|---|---|---|---|
| 1,560,521 | 11/25 | Andrews | 33—193 |
| 1,617,937 | 2/27 | Boucher et al. | |
| 2,086,402 | 7/37 | Countryman | 33—203.21 |
| 2,292,968 | 8/42 | Peters | 33—193 X |
| 2,619,731 | 12/52 | Zenz | 33—193 |
| 2,853,790 | 9/58 | Mac Millan | 33—180 |
| 2,899,753 | 8/59 | Hair | 33—203.21 |
| 2,900,734 | 8/59 | Richards | 33—180 |
| 3,108,382 | 10/63 | Vorpahl | 33—180 X |
| 3,111,773 | 11/63 | Hunter | 33—193 X |

ISAAC LISANN, *Primary Examiner.*